United States Patent [19]
Whiting

[11] Patent Number: 5,095,260
[45] Date of Patent: Mar. 10, 1992

[54] SELF LIMITING BATTERY CHARGER

[75] Inventor: John S. Whiting, Robbinsdale, Minn.

[73] Assignee: Century Manufacturing Company, Minneapolis, Minn.

[21] Appl. No.: 633,305

[22] Filed: Dec. 24, 1990

[51] Int. Cl.⁵ ............................................. H02J 7/04
[52] U.S. Cl. ..................................... 320/22; 320/31; 320/35
[58] Field of Search ...................... 320/20, 21, 22, 23, 320/31, 32, 39, 40

[56] References Cited

U.S. PATENT DOCUMENTS

| | | | |
|---|---|---|---|
| 2,421,523 | 6/1947 | Rady | 320/35 |
| 3,600,661 | 8/1971 | Briggs et al. | 320/35 |
| 3,623,139 | 11/1971 | Dickerson | 320/22 |
| 3,733,534 | 5/1973 | Saslow | 320/23 |
| 3,911,350 | 10/1975 | Swope | 320/22 |
| 4,035,709 | 7/1977 | Seider et al. | 320/23 |
| 4,039,920 | 8/1977 | Popp | 320/22 |
| 4,220,908 | 9/1980 | Nicol | 322/33 |
| 4,341,988 | 7/1982 | Small | 320/31 |
| 4,426,612 | 1/1984 | Wicnienski et al. | 320/39 |
| 4,636,704 | 1/1987 | Nakai | 320/35 |
| 4,667,143 | 5/1987 | Cooper et al. | 320/22 |
| 4,673,862 | 6/1987 | Wahlström | 320/64 |
| 4,755,735 | 7/1988 | Inakagata | 320/35 |
| 4,853,607 | 8/1989 | Walter et al. | 320/36 |

Primary Examiner—Steven L. Stephan
Assistant Examiner—Kristine Peckman
Attorney, Agent, or Firm—Leo Gregory

[57] ABSTRACT

A battery charger which senses the percent of charge in a battery, selects automatically on a continuous basis a constant output charging voltage by switching between two different taps of a transformer, limiting the output voltage not to exceed 17.5 volts to protect the electronic components of the vehicle having the battery therein, against the adverse effects resulting from overcharging and compensating for changes in temperature to maintain a constant level of voltage in continuously charging a battery to the point of being fully charged.

7 Claims, 3 Drawing Sheets

SELF LIMITING BATTERY CHARGER

BACKGROUND OF THE INVENTION

1. Field of Invention

This invention relates to a lead-acid type of battery charger.

2. Brief Description Of The Prior Art

Battery charging is a very active art and there are various types of batteries which are rechargeable. The invention herein relates to automotive type of lead acid batteries.

There are various ways disclosed in the prior art in charging a battery to control the charging operation and to determine that the battery is fully charged. Reference is made to related prior art U.S. patents to indicate what has and is being practiced.

In U.S. Pat. No. 4,853,607 provision is made to sense a full charge and provide a trickle charge to maintain it.

Practiced in U.S. Pat. No. 4,755,735 is the application of a high rate charge based on a time interval and not by control of voltage.

In U.S. Pat. No. 4,673,862, the battery is charged by repeated charging cycles each followed by a testing period to determine the state of the charge.

In U.S. Pat. No. 4,667,143, there is provision for charging a battery at a voltage compared with a reference voltage which varys with the temperature of the battery.

A constant current is provided in U.S. Pat. No. 4,636,704 which controls the charging current and is stopped by a signal element upon completion of a charge.

Temperature compensation is provided in U.S. Pat. No. 4,220,908 which falls linearly with a rising temperature to control output charging voltage.

In U.S. Pat. No. 4,394,612, a voltage comparator monitors a reference voltage to determine if the full charge circuit should be in operation and further provides a trickle charge to maintain a full charge.

Used in U.S. Pat. No. 4,341,988 is a voltage level detector and a control circuit responsive to the output of a voltage comparator controlling the charging in response to the battery voltage attaining a maximum desired level.

In U.S. Pat. No. 3,600,661, a temperature compensating means embodies a voltage regulation means using the regulated voltage to control the charging circuit applied to the battery with dependence upon the temperature present.

In 4,241,523 there is provision for controlling the battery charging rate relative to the battery temperature by the use of a resistance unit to control the charging rate.

There appears to be no particular specific practice of charging a battery in the reviewed art, however, one omission which stands out seems to be a lock of effort to control the charging output voltage and to regulate the charging voltage to be constant.

It is desirable to have means to automatically control the charging or output voltage within specific limits whereby the electronic components of an automotive vehicle will not be adversely affected by any overcharging of the battery.

SUMMARY OF THE INVENTION

The battery charger and the circuitry therein comprising the invention is designed to automatically maintain the charging output voltage between specified limits taking into consideration the present charge condition of the battery and temperature compensation.

The circuitry of the battery charger is designed to keep the output voltage of the charger below 17.5 volts. This is accomplished by having a comparator circuit switch between two taps of a transformer embodied in the charger. One tap has a maximum output voltage below 17.5 volts. The other or lower tap can put out adequate charging current at on the order of 13.8 volts. The tap is automatically selected according to the voltage read at the battery. The limit on the maximum voltage is to prevent damage to electronic components of a vehicle when the battery is charged while installed therein.

The charger also maintains the output voltage to be constant as will be described in detail.

Further, temperature compensation is maintained to raise the output voltage when charged at lower temperatures and charging at a lower output voltage at higher charging temperatures as will be further described in detail.

As will be surmised, the invention herein provides a controlled battery charging voltage maintaining the charging within safe effective limits which prevent any adverse effects upon the electronic components of the vehicle due to overcharging of the battery.

DESCRIPTION OF A PREFERRED EMBODIMENT

The circuitry herein is adaptable to charge either a 6 volt or a 12 volt battery by operation of the switch 17. Also the circuitry is adapted to put out the additional current required to charge a dead battery through line 16 by operation of the switch 18.

The following description, however, relates to and is confined to the charging of a 12 volt lead acid automotive battery.

Figure 1A:
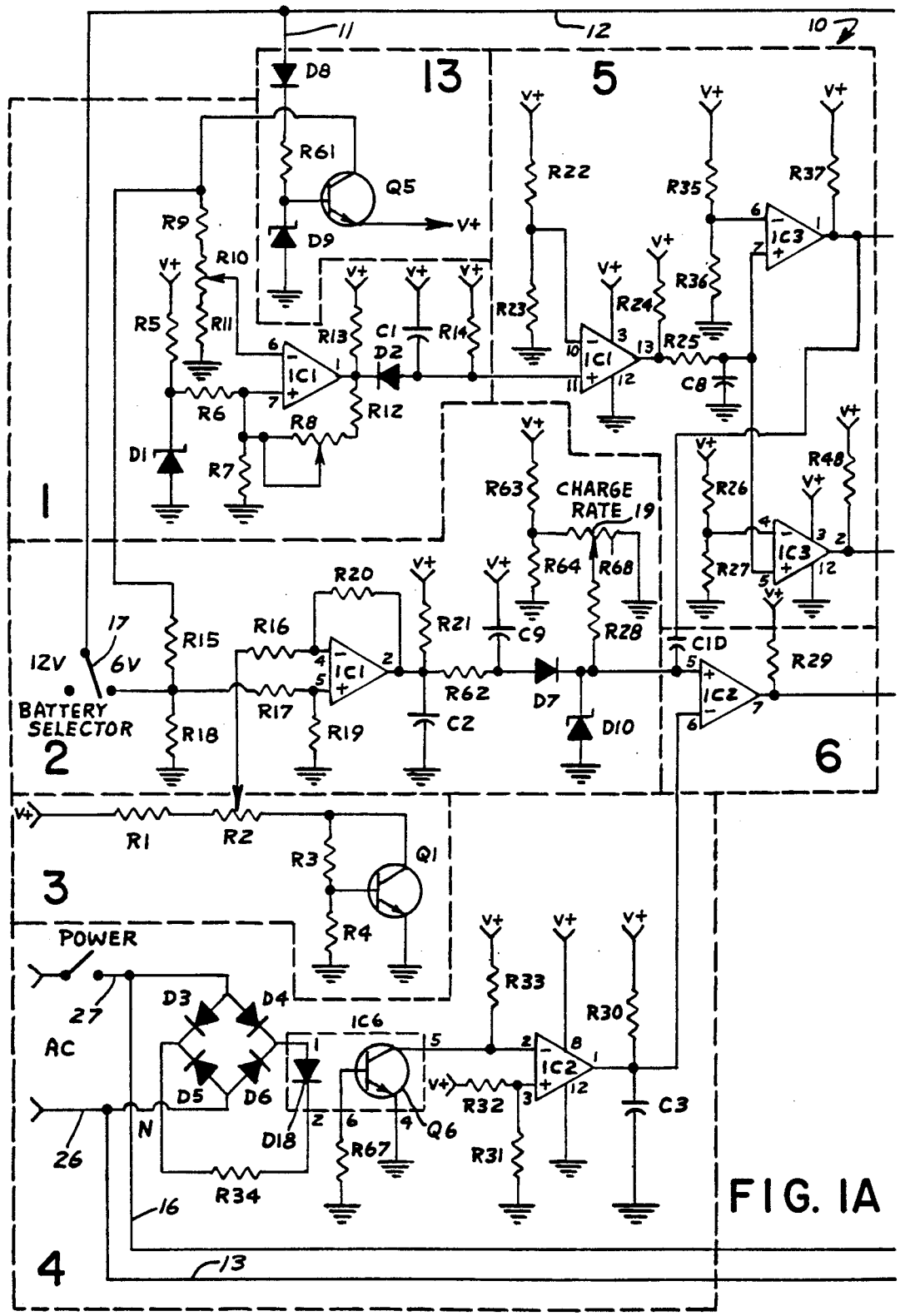
FIG. 1A is a schematic diagram of the electrical circuitry of the battery charger herein showing a first portion thereof.
Figure 1B:
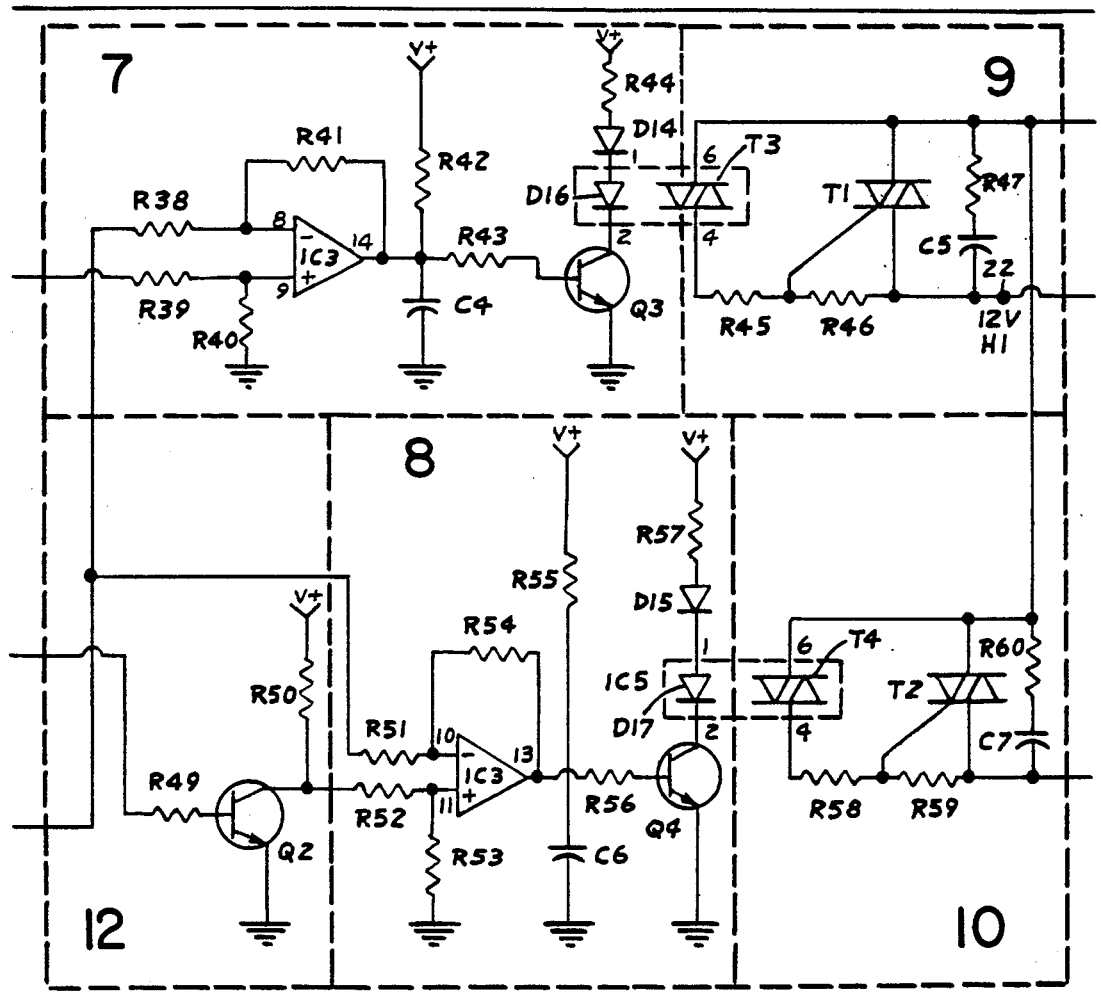
FIG. 1B is a central portion of the schematic diagram of FIG. 1A.
Figure 1B:
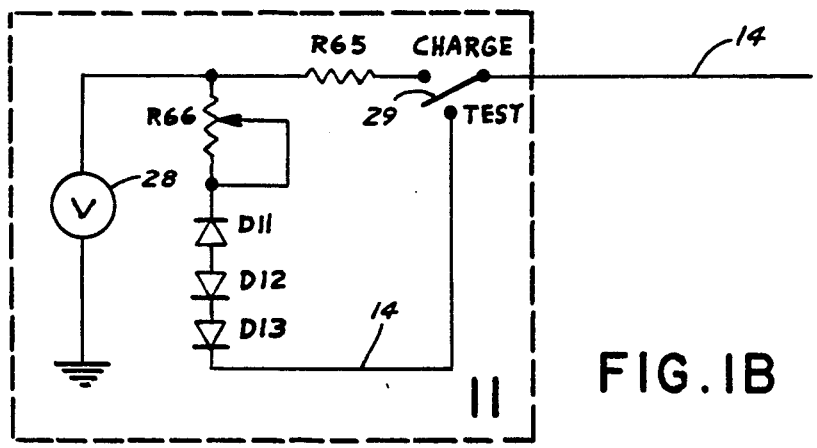
Figure 1C:
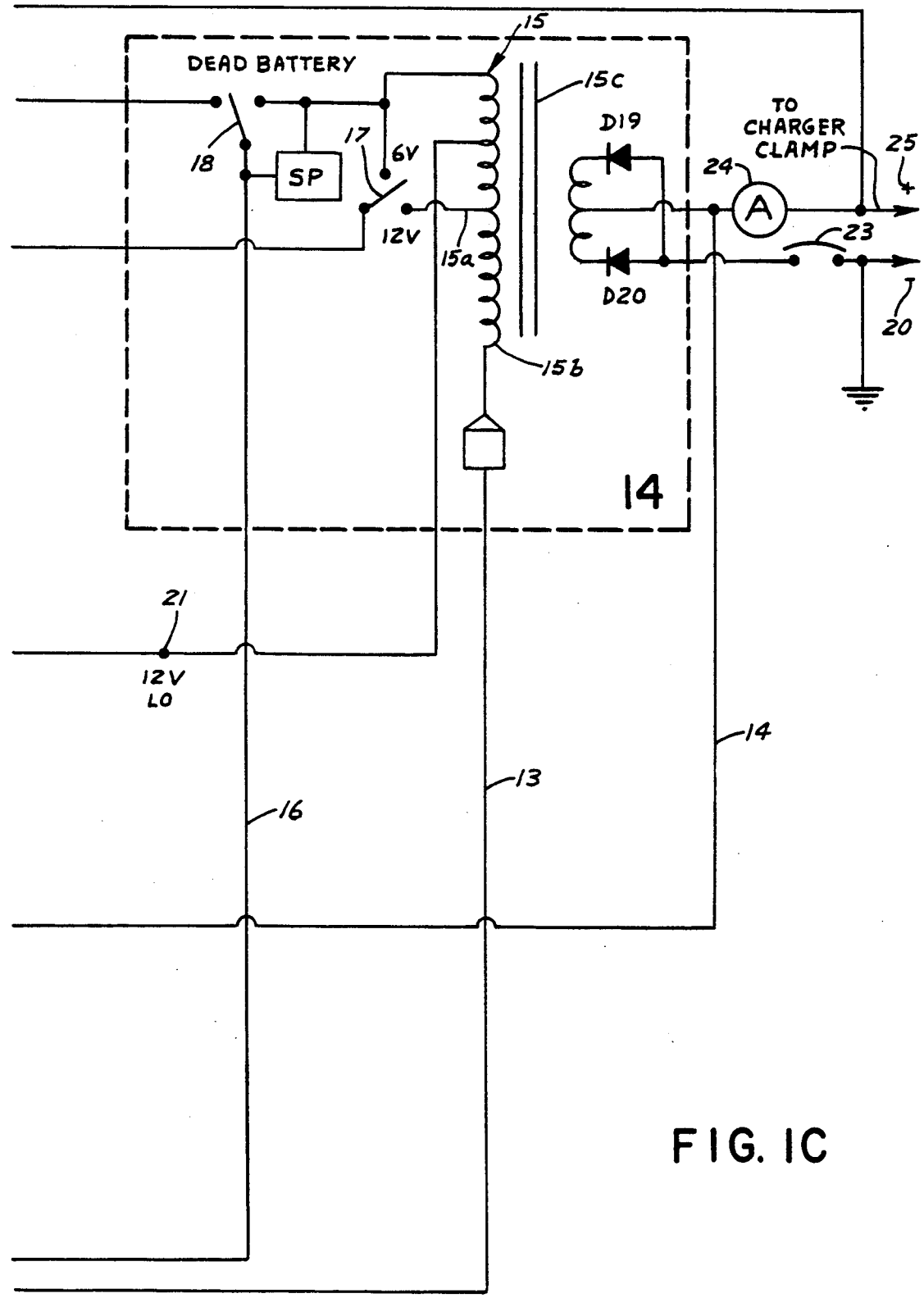
FIG. 1C is the remaining portion of said schematic diagram of FIG. 1A.

Referring to the circuit 10 of FIGS. 1A-C, it will be described with reference to its modules M1-M14. The circuit of FIGS. 1A-C is arranged to maintain the output voltage of the charger of this invention not to exceed 17.5 volts. This is accomplished by use of voltage comparator integrated circuits IC1-IC3 to automatically switch between the use of a high tap 21 and a low tap 22 of the transformer 15.

The above portion 101 of the circuit M4 samples the voltage at the clamps of the battery charger. If this voltage is greater than 17.45 volts, this portion of the circuit signals to change to the low voltage tap and if the voltage goes below 13.6 volts, this portion of the circuit signals to switch back to the high tap. Only one tap is on at any given time.

Referring to M13, the line 11 connected to line 12 runs to the positive charger output clamp of the battery charger, indicated at 25 but not shown, which in turn is connected to the positive battery terminal (not shown) and all of the ground leads are connected to the negative output clamp of the battery charger, indicated at 20 but not shown, which in turn is connected to the negative battery terminal which is not shown. The clamps and the battery terminals are conventional.

Referring to FIG. 1B, the transformer secondary 15C is connected to the cathodes of diodes 19 and 20 which rectify the AC current output from the transformer to DC current. The anodes of said diodes D19 and D20 are connected together and then are connected to one side of a circuit breaker 23 which is connected to the negative charger clamp indicated by 20. The center tap 15a of the transformer is connected to a current meter 24 to indicate the amount of current being delivered to the battery and said meter is connected to the positive charger clamp 25.

The transformer primary 15b is connected to the circuit 10 and to the neutral side of the AC power source 26 by line 13.

IC1 and IC3 are quad comparators which means that there are four comparators in one 14 pin package. Each comparator has a positive and a negative input and an output. All of the comparators in either the 8 pin or 14 pin package share the same voltage supply. The positive voltage supply is referred to as V+ and the negative supply is referred to as GND. Each comparator operates independently comparing the voltage at the positive and negative inputs. Refer to M1, M5 and M6.

The circuitry strives to keep the voltage at a constant level at the clamps of the charger. The voltage of the clamps is compared to a temperature compensating voltage source. A constant voltage is used to keep the battery from being overcharged.

The comparator IC1-1 is used to monitor voltage at the output clamps of the charger. It is also used to select the tap to be used based on the voltage level detected. Further, it is used to provide a hysteresis to prevent rapid switching between taps. The diode D1 provides a reference voltage for IC1-1. The exact voltage is not too critical since the battery voltage being compared to it is a proportional value set by resistors R9, R10 and R11. R10 is used to calibrate the switching point. Resistor R5 supplies the voltage to said diode D1 and limits the current to it. Resistors R6 and R7 (M1) form a voltage divider to set the center point of said comparator. The resistors R6, R7, R8 and R12 are used to set the hysteresis. The resistor R8 is used to calibrate the amount of hysteresis. The hysteresis is either added or subtracted from the center point depending upon the voltage at the output of IC1-1 pin 1. The output switches rapidly from +V sat to −V sat or the reverse depending upon the input to pins 6 and 7 of said IC1-1.

The voltage is supplied to the output through the resistor R13 which also limits the current. The center point of said comparator is set to be proportional to 15.525 and the hysteresis is set to be proportional to 1:925. By adding and subtracting the hysteresis from the center point puts the switch points at 13.6 and 17.45 volts DC. When the voltage at the battery rises above 17.45 volts, the output of the comparator switches to near zero volts DC. This causes the diode D2 to conduct and immediately discharges the capacitor C1 through the output of IC1-1. This causes the positive input of IC1-2 to go near to zero volts. This eventually causes the high tap to be turned off and the low tap to be turned on. If the voltage at the battery drops below 13.6 volts, the voltage at the negative input of IC1-1 drops below the voltage at the positive input causing the output at its pin 1 to switch to +V sat. This causes the diode D2 to stop conducting allowing the capacitor to be charged up by resistor R14.

The output of each comparator needs an external source of power and a current limiter. A pull up resistor R24 is used connected between the regulated voltage supply V+ and the output. When the voltage at the positive input is greater than the voltage at the negative input, the output impedance becomes very high allowing the resistor to pull the voltage up to within 1.5 volts of V+. This voltage is also called V+ sat. When the voltage at the positive input is less than the voltage at the negative input, the output impedance goes low essentially grounding the output. This voltage is called −V sat and is typically within 0.2 volts of ground. Because there is very little capacitance at the output, the output can switch from +V sat to −V sat within two micro-seconds. This allows switching between the taps to occur almost instantly.

Reference is now had to M6 in which the circuitry compares the temperature compensated voltage from the circuitry of M2 to the ramp generated in the circuitry of M4. The output from IC2-1 is a square wave with the duty cycle controlled by the battery voltage. The square wave is synchronized to the AC line 13 by the circuitry of M4. The voltage ramp is connected to the negative input IC2-1 and is compared to the positive input which is from the circuitry of M2. The higher the positive input voltage goes up, the longer the output stays at −V sat. As the voltage at the positive input goes down, the output goes to +V sat sooner.

The rate at which the voltage rises is determined by the size of the values of the resistor R14 and the capacitor C1. These values were chosen to give a one second rise time before the voltage at the positive input of IC1-1 is greater than the voltage at the negative input of the voltage divider formed by R22 and R23 which is used as a reference for the negative input of the comparator.

As described here before, when the positive input becomes greater than the negative input, the output will rapidly switch from −V sat to +V sat. Said resistor R24 is used as a pull up resistor to bring the output of IC1-2 up to +V sat.

The comparator IC3-1 uses resistors R35 and R36 as a voltage divider reference for the negative input and IC3-2 uses R26 and R27 as its voltage divider reference for the negative input. The positive inputs of these two comparators are tied together and are connected to R25 and C8. The resistor R25 limits the current to capacitor C8 causing the voltage across C8 to rise slower than the output of IC1-2. The reference voltages to IC3-1 and IC3-2 are set to different levels so that IC3-2 turns on first and then IC3-1 turns on 8.3 milliseconds later. IC3-1 turns on when IC1-2 turns off. The capacitor C8 is discharged through resistor R25. This causes IC3-1 to turn off, first followed by IC3-2 8.3 milliseconds later. IC3-1 turns on when IC1-2 turns off. The capacitor C8 is discharged through resistor R25. This causes IC3-1 to turn off, first followed by IC3-2 8.3 milliseconds later. R37 and R48 are the pull up resistors for the output of IC3-1 and IC3-2 (M5).

The resistor R49 (M12) is used to limit the current to transistor Q2 which is used as an inverter. When the output of IC3-2 is high the transistor is switched on causing the voltage, at its collector Q2a and its junction with resistor R50, to be switched to −V sat. When the output of IC3-2 goes low, Q2 turns off causing the voltage at its collector to go to +V sat. When the input to Q2 is high, the output of its collector is low and the reverse.

Referring now to M7-8, elements like those making up the circuitry of these modules have been previously described. IC3-3 and IC3-4 are set up as inverting amplifiers with a gain of one. R52, R53 and R39 and R40 form voltage dividers which bear the positive input of IC3-3 and IC3-4. The gain of IC3-3 and IC3-4 are set by the ratio of R54/R51 and R41/R38. These four resistors are all of the same value resulting in a gain of one. This means that for an input of one volt, there is a minus one volt output. The capacitors C4 and C6 keep the output from changing rapidly which makes IC3-3 and IC3-4 into amplifiers and not comparators. Resistors R55 and R42 are pull up resistors supplying voltage to the output of the amplifiers. R51 and R38 receive a square wave input from IC2-1. The input will be either at +V sat or −V sat. So the positive input for the amplifiers IC3-3 and IC3-4 are either biased at one half of the input voltage at R52, R39 or at zero. The positive input must be biased at some voltage in order to get an output. When the negative inputs are at −V sat, the positive inputs determine the state of the output. The output follows the positive input.

The transistors Q3 and Q4 are used to switch on and off IC4 and IC5.

The outputs from said amplifiers cannot supply enough current to turn on the opticouple diodes D16 and D17. When the outputs of IC3-3 and IC3-4 are positive, the transistor, either Q3 or Q4 is turned on as determined by IC1-1.

The resistors R56 and R43 are used to limit the current drawn by said transistors. They act like a switch that when turned on they essentially ground to the cathodes of the opticoupled diodes IC5 and IC4. When either Q3 or Q4 is turned on current flows through resistor R57, diode 15, IC5 or R44, D14 and IC4. The current is limited by resistors R57 and R44 (M 7,8).

When the opticouple D16 or D17 is forward biased, it emits a light which optically triggers the triacs T3 or T4. The resistors R58 and R45 limit the current which triggers the triacs T1 and T2. Resistors R59 and R46 are used to insure that the triacs turn off after each half cycle. Resistors R60 and R47 and capacitors C7 and C5 form a snubber network which slows down the rate of voltage charge across the triacs. A fast rate of change of voltage can falsely trigger a triac on.

By controlling when the triacs turn on in each half cycle, the voltage delivered to the transformer is controlled and the amount of current delivered to the battery is controlled.

Referring to M3, the circuitry therein supplies the temperature dependent voltage reference to the amplifier IC1-3. Resistors R3 and R4 are used to bias the transistor Q1. The resistors set the transistors in a linear region where any change in temperature will cause a change in voltage at the collector Q1a of Q1. The rate of voltage change is −22 millivolts per °C. Resistor R1 limits the current and resistor R2 allows adjustment of the voltage. R2 is used to set the output voltage of the charger. After it is set, a constant voltage to the battery is maintained. This ensures a fully charged battery but prevents overcharging even if the AC input voltage is over 120 volts.

The charger automatically maintains a constant voltage to the battery. The charger also has a control to adjust the current supplied to the battery. The switch 17 for a 6 volt battery selects a lower output voltage than for a 12 volt battery. The switch shorts out R18 which changes the voltage divider formed by R15, R17, R18 and R19. The sealed voltage out of the divider is connected to the positive input of IC1-3. IC1-3 is set up as on a non-inverting amplifier with a gain of of 27.5. The difference between the positive and negative inputs is amplified. The gain is set by R16/R20. The reference voltage is applied through R16 from the temperature dependent voltage source. As the battery voltage goes up, the voltage out of the amplifier goes up. R21 supplies the current to the output of the amplifier. The capacitor C2 limits the rate of charge of the output turning IC1-3 into an amplifier instead of a comparator. Resistor R62 is used to limit the current to capacitor C9. This keeps the voltage of the cathode of D7 from changing rapidly and making the charger oscillate. The diode D7 is used to isolate the output of the amplifier from resistor R28 which is connected to the wiper of the current control potentiometer 19. Resistors R63 and R64 form a voltage divider to set the maximum voltage to which the potentiometer can be adjusted. The other end of the potentiometer is connected to ground so that the voltage at the resistor R28 can be set between ground and $$\frac{V+}{R63 + R64} \times R64.$$

Diode D10 limits the maximum voltage that the positive input of IC2-1 will see.

Referring to M6, the circuitry here compares the temperature compensated voltage from M2 to the ramp generated by the circuitry of M4. The output from IC2-1 is a square wave with the duty cycle controlled by the battery voltage. The square wave (not shown) is synchronized to the AC line 27. The voltage ramp is connected to the negative output of IC2-1 and is compared to the positive input which is from the circuitry of M2. The higher the positive input voltage goes up, the longer the output stays at −V sat. As the voltage at the positive input goes down, the output goes to +V sat sooner.

A capacitor C10 is used as a connection between the input of IC2-1 and the output of IC3-1. When the output of IC3-1 changes from −V sat to +V sat, the capacitor C10 pulls the positive input of IC2-1 to +V sat. The voltage across C10 slowly decreases. This causes the charger output voltage to slowly rise from zero. This prevents any voltage spikes or power surges caused by switching taps. The resistor R29 is used as a pull up resistor to bring the output of IC2-1 up to +V sat.

A resistor R67 is used to remove any charge from the base of the opticouple transistor Q6 of IC6. A charge build up at the base could cause the transistor to turn on giving false zero crossing information.

Referring to the circuitry of M4, this circuitry is used to synchronize the control of the charger to the AC line and to generate a ramp to make a variable duty cycle square wave.

The lines 26 and 27 supply the AC input from the charger's power cord. When the line 27 (H) is positive with respect to the line 26 (N), current will flow through diodes D4, D18, resistor 34 and diode D5 back through said line 26 completing the circuit. This will cause a light emitting diode in IC6 to turn on the opticouple transistor Q6.

When line 26 (N) is positive with respect to line 27 (H), current flows through diodes D6, D18, resistor 34, D3 and back through line 27 (H) completing the circuit. This will again cause the light emitting diode to turn on the transistor Q6. The only time the transistor is turned off is when the AC line voltage is between −2.1 volts and +2.1 volts (there is a 0.7 volt drop at each of said three diodes). IC6 provides 3,000 volt isolation between the AC line and the battery. Resistor R34 limits the current through the diodes. When the opticoupled transistor of IC6 is turned on, it causes the voltage at the negative input of IC2-2 to go to near zero. The resistor R33 supplies the current to the collector of said transistor Q6. Resistor R33 is essentially grounded whenever said transistor is turned on.

When the transistor is turned off, the voltage of the negative input of IC2-2 goes to +V. It is only at +V when the AC line is within ±2/1 volts at the zero crossing. So the negative input receives a quick voltage pulse at each zero crossing of the AC line.

Resistors R32 and R31 form a voltage divider reference for the positive input of IC2-2. Whenever a pulse occurs (120 times per second) the negative input to the capacitor C3 is greater than the positive input. This causes the output to quickly discharge capacitor C3. After the pulse, the negative input drops below the positive input allowing resistor R30 to slowly charge capacitor C3. The value at resistor R30 and capacitor C3 determines the slope of the ramp. These two were chosen to allow the capacitor to completely charge in 1/120 seconds which is the time between pulses.

Referring now to the M13, the cathode of the diode D8 is connected to the battery and conducts only when it is connected to the positive side o terminal of the battery. This prevents a reverse battery connection from damaging the rest of the circuitry. The resistor R61 limits the current to the zener diode D9. The zener voltage drives the base of the transistor Q5. The DC output voltage is regulated to within one diode drop of the zener voltage.

Referring to M11, the resistor 65 is used to limit the current to the voltmeter 28 which is connected in series. The value was chosen to allow 25 milliamps of current at 20 volts. Twenty-five milliamps is the current necessary to deflect the voltmeter full scale. When a test switch 29, on the panel of the housing is held in on position, the line 14 is connected to the positive side of the battery, the diodes D12 and D13 create a 10.2 volt drop. Diode D11 creates a 0.7 volt drop as well as protecting the circuit from reverse voltage. The resistor R66 is used to calibrate the meter by allowing the amount of current being delivered to the meter until the voltage is greater than 10.9 volts (10.2+0.7 volts).

This changes the sensitivity of the meter from 0 to 20 volts to 10.9 to 20 volts. The increased resolution is needed to measure small changes in battery voltage.

Thus it is seen that I have provided a very desirable battery charger which is self-operative and assures that when a battery within a vehicle is being charged, there will be no adverse effects on the electronic equipment of the vehicle and the charging will cease when the battery has been fully charged.

It will of course be understood that various changes may be made in the form, details, arrangement and proportions of the product without departing from the scope of the invention which, generally stated, consists in a product capable of carrying out the objects above set forth, in the parts and combination of parts disclosed and defined in the appended claims.

What is claimed is:

1. A battery charger circuit controlling the safe charging of a lead acid storage battery, having in combination,
   a transformer embodied in a battery charger circuitry,
   means in said circuitry producing a DC charging voltage for a battery,
   said transformer having a high tap and a low tap,
   a voltage sensing means signals for a shifting from said high tap of said transformer to said low tap of said transformer when the charging voltage reaches 17.45 volts and signals for a shifting from the low tap to the high tap when the voltage is below 13.6 volts,
   means sensing the temperature at said battery, and
   means varying the charging voltage to compensate for temperature increases and temperatures decreases.

2. The structure of claim 1, including
   means causing a short period of delay in switching from the low tap to the high tap of said transformer to keep the battery charger from cycling rapidly.

3. The structure of claim 1, wherein
   said transformer has its center tap connected to a current meter, and
   said meter is connected to a charger clamp on said battery indicating the amount of current being delivered to the battery.

4. The structure of claim 1, wherein
   said sensing means comprising comparator circuits which with regard to a reference voltage determine which tap of the transformer should be used to provide a constant level of said charging voltage to the battery.

5. The structure of claim 1, including
   a diode in circuit with said battery for charging purposes, and
   said diode conducting only when connected to the positive terminal of the battery.

6. The structure of claim 1, including
   means which upon said circuitry switching taps on said transformer causes the charging voltage to slowly rise from zero and thus prevents power surges and voltage spikes.

7. A battery charger circuit controlling the safe charging of a lead acid storage battery, having in combination
   a transformer embodied in a battery charger circuitry,
   means in said circuitry producing a DC charging voltage for a battery,
   said transformer having a high tap and a low tap,
   means upon sensing the charging voltage at a high level signalling for a switch from said high tap to said low tap of said transformer,
   means upon sensing the charging voltage at a low level signalling for a switch from said low tap to said high tap of said transformer,
   means responsive to said signalling for switching said circuitry from one tap to the other tap,
   said sensing means consist of comparator circuits which with regard to a reference voltage determine which tap of the transformer should be used to provide a constant level of charging voltage to the battery,
   means sensing the temperature at said battery, and
   means varying the charging voltage to compensate for temperature increases and temperature decreases.

* * * * *